United States Patent [19]

Pfeiffer

[11] Patent Number: 5,634,561

[45] Date of Patent: Jun. 3, 1997

[54] ANTISTATIC BLOW-MOLDED BULK CONTAINER

[75] Inventor: Pierre Pfeiffer, Drulingen, France

[73] Assignee: Sotralentz S.A., Drulingen, France

[21] Appl. No.: 410,781

[22] Filed: Mar. 24, 1995

[30] Foreign Application Priority Data

Mar. 25, 1994 [DE] Germany ................... 9405092 U
Dec. 24, 1994 [DE] Germany ................... 44 46 585.8

[51] Int. Cl.$^6$ ................................................ B65D 19/06
[52] U.S. Cl. ............................ 206/719; 206/386; 220/457
[58] Field of Search ............................ 206/386, 597, 206/709, 719; 220/1.5, 454, 457

[56] References Cited

U.S. PATENT DOCUMENTS

| | | | |
|---|---|---|---|
| 4,494,651 | 1/1985 | Malcolm | 206/719 |
| 4,528,222 | 7/1985 | Rzepecki et al. | 206/719 X |
| 5,253,777 | 10/1993 | Schutz | 206/386 X |
| 5,478,154 | 12/1995 | Pappas et al. | 383/117 |

*Primary Examiner*—Jacob K. Ackun
*Attorney, Agent, or Firm*—Herbert Dubno; Andrew Wilford

[57] ABSTRACT

A molded synthetic-resin container having a wall with an outer surface has a layer of conductive particles imbedded in at least a portion of the wall at the outer surface thereof. This layer is made according to the invention, after blow-molding of the container, by heating and thereby disrupting a surface region of the container, then applying a conductive powder to the disrupted surface region, and finally heating the powder on the disrupted surface region and sintering it into the disrupted surface region.

6 Claims, 3 Drawing Sheets

ANTISTATIC BLOW-MOLDED BULK CONTAINER

FIELD OF THE INVENTION

The present invention relates to a bulk container for transporting large quantities of liquid or fluent particles. More particularly this invention concerns such a container which is specially designed to dissipate static electricity so it can be used with flammable or explosive materials.

BACKGROUND OF THE INVENTION

It is standard to ship fluent materials—liquids and particles—in large blow-molded containers that are usually carried on pallets. Such containers frequently hold up to 1 $m^3$ and represent a very efficient way to contain and transport various materials many of which are fairly volatile and/or otherwise capable of exploding or, at the very least, burning if ignited. Loading and unloading the containers, typically by pouring the contents in or out, generates substantial electrostatic energy that can create a spark that can result in ignition of the material and a dangerous accident.

In order to suppress such electrostatic energy it is standard to make the plastic of the containers conductive so that any charge is quickly carried off and never gets large enough to make a spark. When such a container is carried on a so-called cage-type pallet where it is surrounded by a heavy-duty metal mesh that is highly conductive, the result is fairly good anti-static protection.

Such conductivity of the container itself is obtained by incorporating conductive carbon particles into the resin from which the container is blow molded. Since it is normally inconvenient to divide up the production line for such containers, even those that do not need the antistatic protection are formed of the carbon-filled plastic. This adds unnecessarily to the cost of production of these containers.

In addition mixing carbon fibers with the plastic of the container does not produce a high degree of conductivity. Even when carbon black is used, resistances can be in the 10,000 ohm range, where in practice the desired resistance is about 0.1 ohm.

OBJECTS OF THE INVENTION

It is therefore an object of the present invention to provide an improved container with protection against electrostatic charge.

Another object is the provision of such an improved container with protection against electrostatic charge which overcomes the above-given disadvantages, that is which can be made at low cost and that produces a very conductive container.

A further object is to provide an improved method of making such a container and/or of treating a blow-molded such container to give it antistatic-electricity properties.

SUMMARY OF THE INVENTION

A molded synthetic-resin container having a wall with an outer surface has according to the invention a layer of conductive particles imbedded in at least a portion of the wall at the outer surface thereof. This layer is made according to the invention, after blow-molding of the container, by heating and thereby disrupting a surface region of the container, then applying a conductive powder to the disrupted surface region, and finally heating the powder on the disrupted surface region and sintering it into the disrupted surface region.

The result is a container whose surface is highly conductive so that any static-electric charge will be dissipated before it can generate a dangerous spark. The treatment can be applied relatively easily only to those containers which need to be given antistatic properties so that the production cost of other containers used for less dangerous materials is not affected.

The invention is based on the discovery that the antistatic properties can be imparted to the container after it is formed. When only the surface is rendered conductive the desired antistatic properties are obtained without affecting the overall strength of the container.

According to the invention this layer covers all or most of the outer surface of the container, normally the upper third or half at least. Since the static charge typically is created most strongly around the fill nipple, this region is treated according to the invention.

Alternately the layer is applied as an array of crossing strips. The strips are annular and completely encircle the container. Where they cross they are in electrical contact, forming a good charge-dissipation path.

The powder in accordance with this invention is of copper or zinc. Furthermore the container can be used with a pallet having a conductive metallic cage surrounding the container and in electrical contact with the layer of conductive particles. This ensures excellent grounding of the container, especially when the pallet and surface region are of the same metal, for instance when zinc powder is used to treat the container and a galvanized cage pallet is used.

In accordance with a further feature of this invention the surface region and powder are heated by a flame. It is also possible to heat with a spark or corona discharge or with a plasma.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
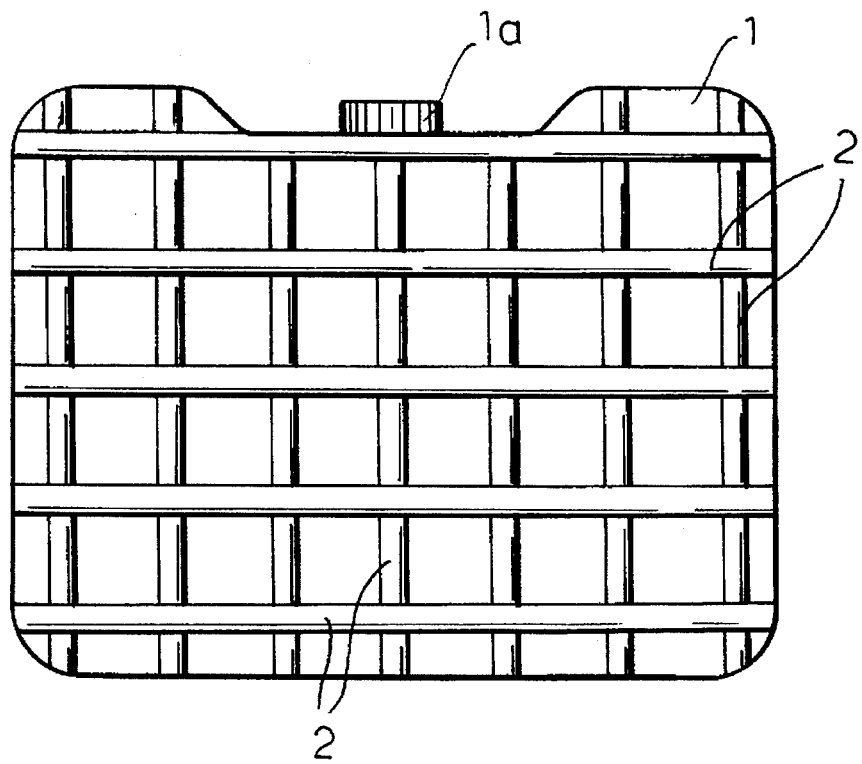
FIGS. 1, 2, and 3 are front, side, and top views of a container according to the invention.
Figure 2:
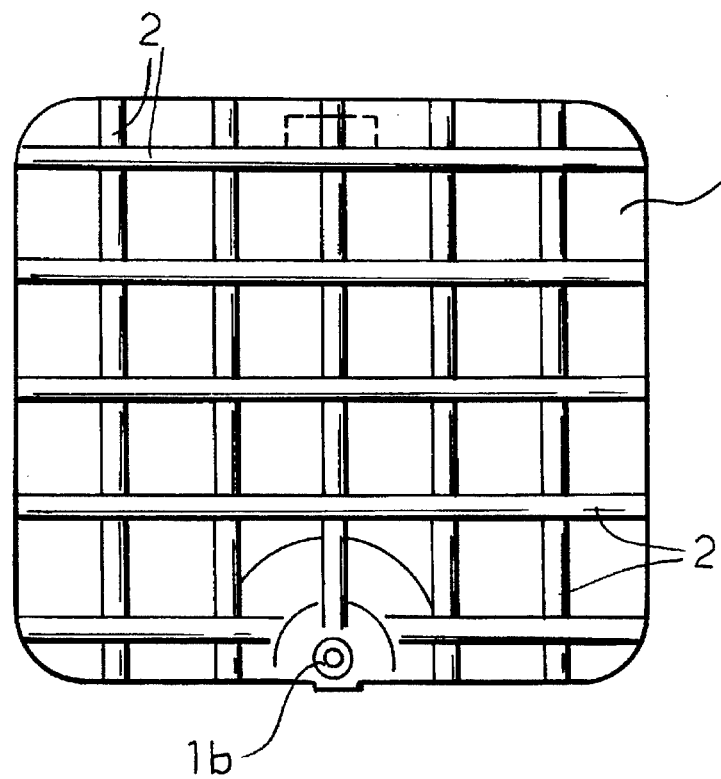
Figure 3:
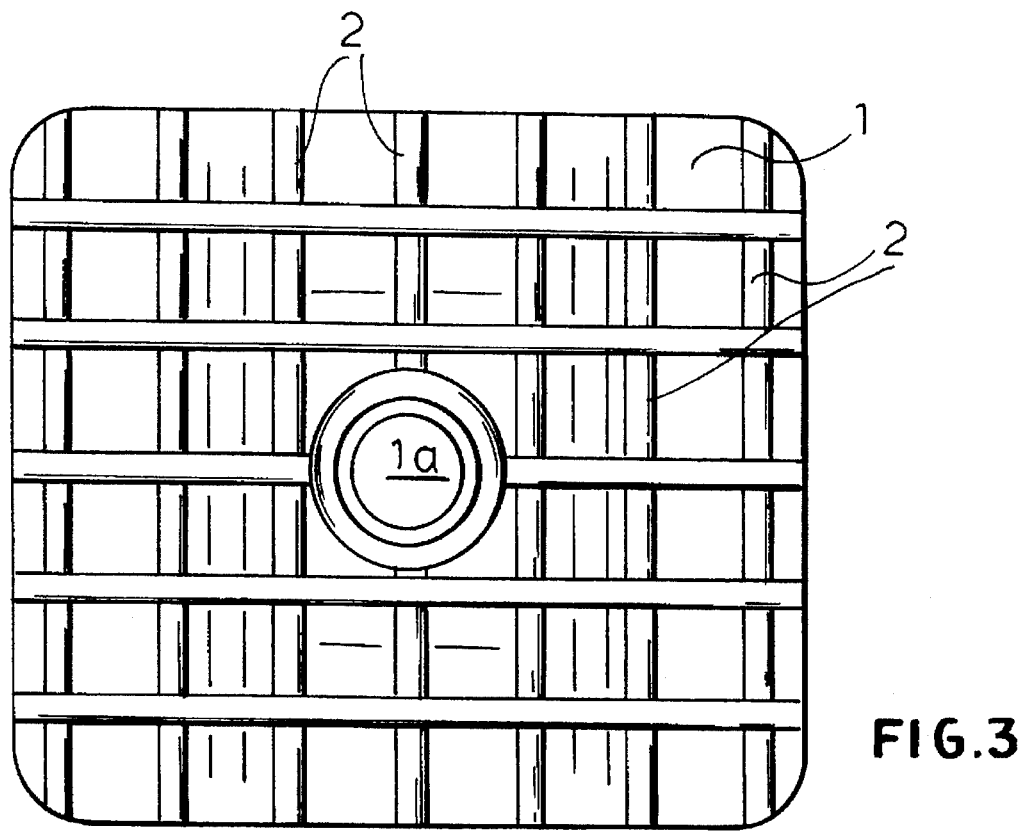

As seen in FIGS. 1 through 3 a container 1 according to this invention is formed as a round-corner cube about 1 m on a side, with an upper fill opening 1a and a side drain opening 1b. According to the invention strip regions 2 of its entire surface are imbedded with copper particles so that they are conductive. These strips 2 vertically and horizontally encircle the entire container 1 and form squares at most 15 cm, preferably 10 cm, on a side. The open space between crossing strips 2 according to the invention should not exceed about 100 $cm^2$, something easily achievable with a 10 cm spacing, or with closely spaced vertical strips 2 and widely spaced horizontal strips forming rectangles measuring 20 cm by 5 cm.

Figure 4:
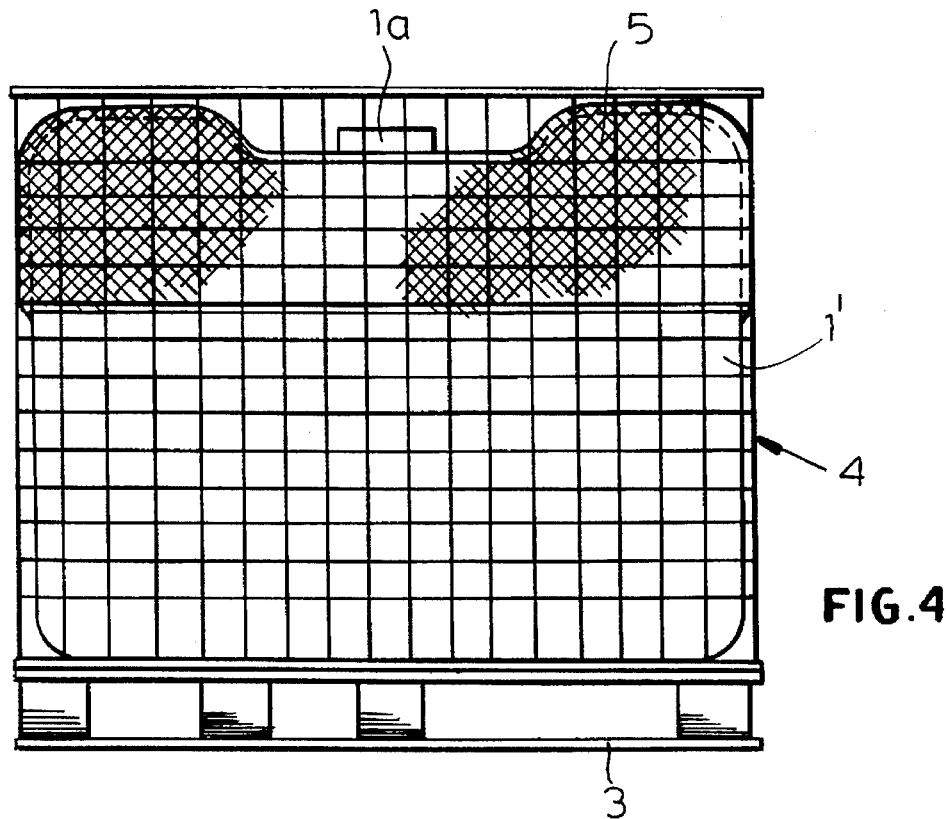
FIGS. 4 and 5 are side and top views of another container in accordance with this invention.
Figure 5:
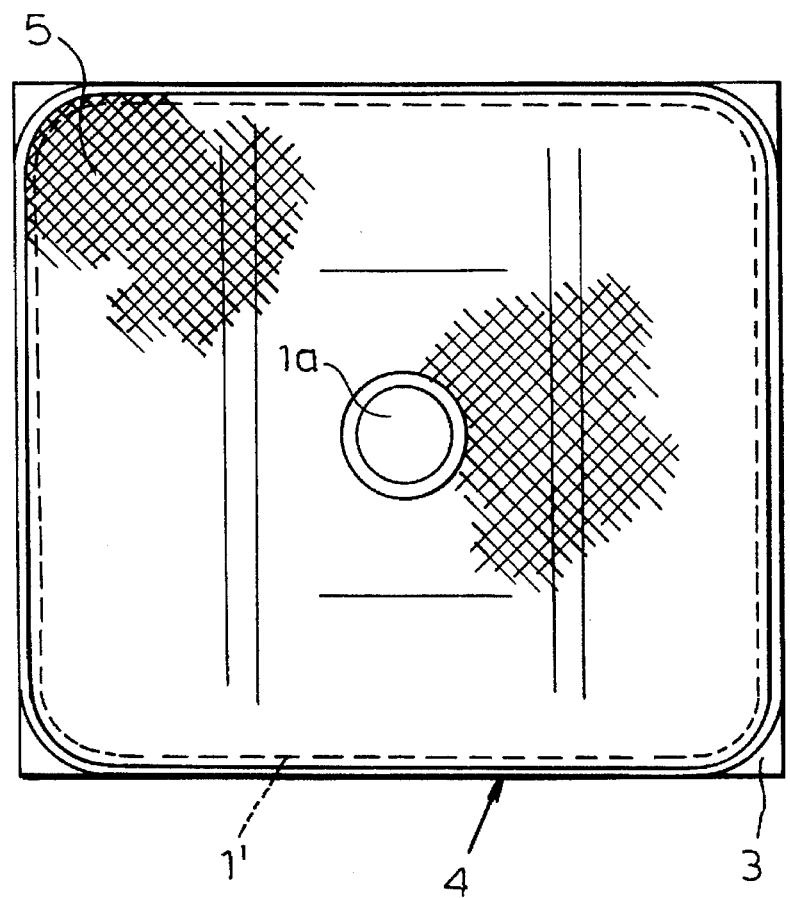

In FIGS. 4 and 5 a container 1' is shown that is sitting on a metallic, plastic, or wood pallet 3 to which is attached a basically upwardly open mesh cage 4 formed of galvanized steel rods or wire. The container 1' has an upper region 5 that is completely layered with the conductive powder, here zinc, all around the central fill opening 1a.

Figure 6:
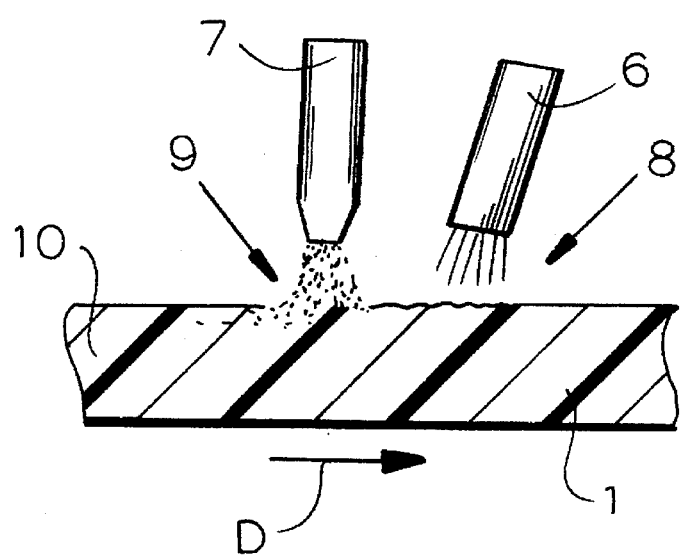
FIG. 6 is a largely schematic view illustrating the treatment method of this invention.

As shown in FIG. 6 the regions 2 or 5 are produced according to this invention by moving the container 1 relative to a heat gun 6 trailed in a movement direction D by a powder spray nozzle 7. The heat gun 6, which can be a simple flame, a corona-discharge device, or a plasma jet, disrupts the surface at 8 by liquefying it, and then the particles 9 are applied to the disrupted surface at 9 so that they are sintered by the heat of the gun 6 and imbedded in a surface area 10 forming the region 2 or 5.

I claim:

1. In a molded synthetic-resin container having a wall with an outer surface, the improvement comprising a layer of sintered conductive particles imbedded in at least a portion of the wall only at the outer surface thereof; and a conductive metal cage surrounding the container and in electrical contact with the layer of conductive particles.

2. The molded container defined in claim 1 wherein the layer covers most of the outer surface of the container.

3. The molded container defined in claim 1 wherein the layer is applied as an array of crossing strips.

4. The molded container defined in claim 3 wherein the strips completely encircle the container.

5. The molded container defined in claim 1 wherein the particles are of copper or zinc.

6. The molded container defined in claim 1, further comprising a pallet carrying the conductive metallic cage.

* * * * *